(12) United States Patent
Hetzel (10) Patent No.: US 8,108,158 B2
(45) Date of Patent: Jan. 31, 2012

(54) ELECTRO-HYDRAULIC TIMED ANGLE CONTROLLED JOINT SIMULATION TORQUE CALIBRATION, CERTIFICATION AND ANALYSIS DEVICE

(75) Inventor: Adrian H. Hetzel, Spartanburg, SC (US)

(73) Assignee: Adrian H. Hetzel

( * ) Notice: Subject to any disclaimer, the term of this patent is extended or adjusted under 35 U.S.C. 154(b) by 972 days.

(21) Appl. No.: 11/992,964

(22) PCT Filed: Sep. 28, 2006

(86) PCT No.: PCT/US2006/038345
§ 371 (c)(1),
(2), (4) Date: Mar. 28, 2008

(87) PCT Pub. No.: WO2007/038769
PCT Pub. Date: Apr. 5, 2007

(65) Prior Publication Data
US 2009/0265135 A1    Oct. 22, 2009

(51) Int. Cl.
*G01L 3/00* (2006.01)
*G06F 11/00* (2006.01)
(52) U.S. Cl. .......................................................... 702/43

(58) Field of Classification Search ..................... 702/43
See application file for complete search history.

(56) References Cited

U.S. PATENT DOCUMENTS

| | | | | |
|---|---|---|---|---|
| 4,150,559 A | * | 4/1979 | Levy | 73/1.11 |
| 6,202,028 B1 | * | 3/2001 | Crane et al. | 702/43 |
| 6,595,034 B1 | * | 7/2003 | Crane et al. | 73/1.12 |
| 6,718,831 B2 | * | 4/2004 | Chiapuzzi et al. | 73/761 |
| 6,785,591 B1 | * | 8/2004 | Hansson | 700/275 |
| 6,868,742 B2 | * | 3/2005 | Schoeps | 73/862.21 |

\* cited by examiner

*Primary Examiner* — Cindy Hein-Dieu Khuu (57) ABSTRACT

A joint simulator is provided having a housing with a chamber, a piston, slidable within the chamber, and a shaft rotatable within the housing, the shaft having (i) an end configured to engage a power tool to be tested, and (ii) a threaded end engaged with the piston, whereby rotating the shaft causes the piston to slide within the chamber. Hydraulic fluid fills a section of the chamber formed by a side of the piston and the housing, and computer software controlled pressure and relief valves are actuated to regulate the flow of hydraulic fluid in the chamber, to achieve target pressures. The pressure of the hydraulic fluid creates resistance to rotation of the shaft, thereby increasing the torque relative to the angular increase on the shaft and/or relative to time. The joint simulator is provided with means to determine the angular displacement and torque applied to the shaft.

20 Claims, 12 Drawing Sheets

ELECTRO-HYDRAULIC TIMED ANGLE CONTROLLED JOINT SIMULATION TORQUE CALIBRATION, CERTIFICATION AND ANALYSIS DEVICE

TECHNICAL FIELD

This invention is intended to provide a new process and apparatus for the calibration, testing and analysis of impulse power tools used to tighten threaded fasteners.

BACKGROUND ART

During a typical clamping phase of a tightening event, the torque applied to the fastener increases as the friction between the threads of the fastener and the threaded body into which the fastener is being screwed increases. The tightening event may be described as an angular increase in the orientation of the fastener.

Prior art joint simulators typically rely upon a frictional brake to increase torque, while a power tool is being tested. In Crane et al., U.S. Pat. No. 6,202,028 B1, a computer controls the magnitude of the braking torque applied to a shaft, to simulate the increase in torque that occurs when a joint is being tightened. Chiapuzzi et al., U.S. Pat. No. 6,718,831 B2, disclose a screwer test bench in which a pressurized fluid is used to control a frictional brake for increasing torque during joint simulation.

A shortcoming of the prior art joint simulators is that the friction is generated by braking pads or discs applied to a rotating shaft, rather than the movement of the threads of a fastener within a threaded body. Further, when braking pads or discs are used to simulate a joint, the inertia of the system is often changed relative to the joint being simulated, which can lead to errors, particularly when testing an impulse power tool. Still further, many prior art joint simulators employ in-line transducers and angle encoders, which change the inertia of the system and lead to errors.

Torque rate may be defined as the increase in torque with angular increase, while advancing a fastener in a threaded joint. The torque rate may be calculated by obtaining measuring the torque at various points of angular displacement, during the tightening process. The measurements may then be used to program a joint simulator to vary the rate of torque during the simulated tightening process. Nevertheless, an important consideration when simulating a joint, especially with regard to impulse power tools, is the time versus angle correlation. Few prior art joint simulators are capable of incorporating angle versus time into a process for joint simulation.

SUMMARY OF THE INVENTION

An object of the present invention is to provide a joint simulator for testing a power tool, which overcomes the aforementioned shortcomings. The present joint simulator features a threaded shaft having an end engaged with a threaded opening in a piston, whereby rotating the shaft (for example with a power tool) causes the piston to slide. The shaft is supported by a housing, and the piston slides within a chamber formed in the housing. A hydraulic fluid fills a section of the chamber between the housing and the piston. Thus, as the shaft is rotated, the pressure of the hydraulic fluid against the piston increases. Pressure and relief valves regulate the flow of hydraulic fluid in and out of the section of the chamber between the housing and the piston. A computer software program actuates the pressure and relief valves to maintain the desired hydraulic pressure in the joint simulator, relative to the angular displacement of the shaft. In other words, as the power tool rotates the shaft, the piston slides within the chamber and the torque required to rotate the shaft is varied by increasing the pressure of the hydraulic fluid within the chamber between the housing and the piston. The performance of the power tool being tested is recorded by the joint simulator and compared to the joint analysis data obtained from the actual joint, to determine whether the power tool is in compliance.

DESCRIPTION OF THE INVENTION

In conjunction with a traditional torque transducer used to measure the output of a power tool, this proposed process and apparatus adds a timed control of joint angle simulation to accurately reproduce joint characteristics as seen in the "real world" application of impulse power tools to assemble threaded joints. This invention is believed to be unique in that beyond simply using torque and angle to define the characteristics of joint, a very important previously excluded evaluation and simulation criteria, effective (real) tightening time versus angle, is now used to control the application of torque with respect to angle, to accurately reproduce a specific threaded joint on an assembled product. This additional time characteristic is critical for the proper evaluation of impulse power tools. Through variation of this timed control of joint angle simulation until the correct simulated joint characteristic is observed, allows all of the remaining types of power tools used to tighten threaded fasteners to be certified and analyzed on this new invention as well as hand held torque wrenches.

Figure 1:
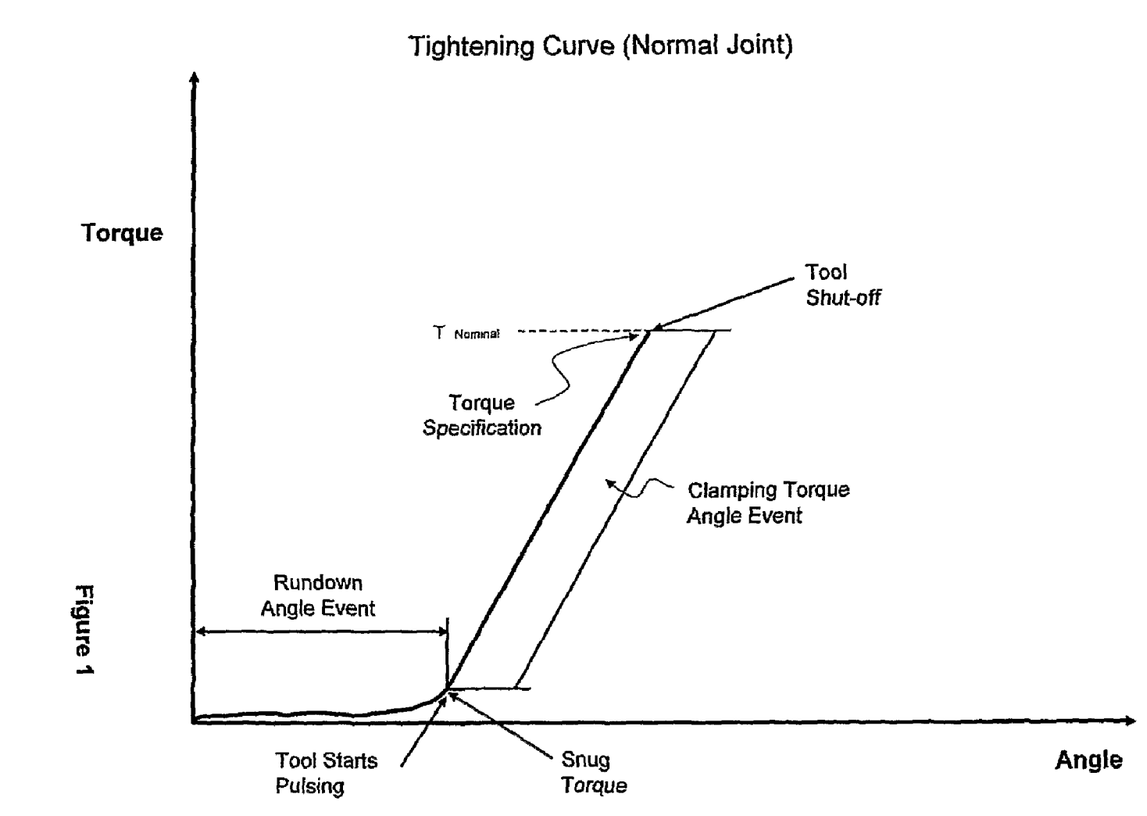
FIG. 1 is a graph of a torque versus angle, for tightening a typical joint.

Prior to the evaluation of impulse power tools, there must be an analysis of the joint which is going to be simulated using the invented apparatus. Using currently available torque and angle analysis equipment and methods, a torque and angle tightening curve analysis is performed for the specific joint which is to be reproduced. This torque and angle analysis provides a consistent joint rate which is expected for the specific product threaded joint. An example of a normal linear tightening without prevailing torque can be seen in FIG. 1—Tightening Curve Normal Joint. In this illustration, a low rundown torque is observed until the snug torque point at which time the parts mate together after which linear tightening occurs until the target torque is achieved. This torque and angle measurement provides the expected torque associated with the angle for the joint being simulated. During a correct simulation with the invention, the output from the torque transducer on the joint simulator should coincide with the angle values as observed on the measured product joints.

Next, through the use of residual torque evaluations (breakaway torque readings are made on the tightened production joints to determine the setting of the impulse tool), the impulse power tool is adjusted to produce the correct nominal tightening condition on the specific product threaded joint. Now, the new process of evaluating the compliance (or response during the tightening process) of the joint using time is accomplished using a rotational angle sensor signal, or an impulse counter signal and a multi-channel data collection/analysis device. For measurement of the angle and time characteristic of the tool and joint, the impulse tool must be configured in the same way as it is used in production without modifying the physical characteristics of the tool output drive sockets, bits, extensions, etc. This is believed to be a unique aspect of real time measurement of the tightening process, which has not been utilized up until the present invention. The importance of not changing the tool or joint characteristics is that if the tool/joint configuration is modified, the pulse strength, frequency and duration are influenced by changes in inertia and through the hammer effect associated with additional drive interfaces and drive interface gaps. Using the multi-channel data collection device to simultaneously capture the impulse signature versus time and/or the rotational angle information versus time during fastener tightening with the preset tool on the production specific joint, an overlay of the tightening analysis data provides the angle, pulse and time information for hydraulic pressure and relief events on the invented apparatus. The impulse signature determines the time required for fastener rundown, prevailing torque (if any), clamping torque and yield torque (if any). Each of these timed events is correlated with an angle characteristic which is then used to control the performance of the invented machine. This invention includes the process of specific joint and impulse power tool angle and pulse versus time analysis.

There are two characteristics which comprise the angle and time analysis of a joint to determine the compliance, which is linked with the specific joint and the assigned impulse power tool for tightening the joint. The first is the angle value associated with time as the fastener is being tightened with the power tool. The second is the pulse count associated with time as the fastener is being tightened.

Initially we will discuss the angle and time analysis. As stated, we need to recognize the increase of angle when tightening while recording the time value as the angle is increasing. This is accomplished through the use of a rotational motion sensor to capture the angle characteristic. Either an external rotational motion sensor or a rotational motion sensor which is integrated inside of a manufacturer's impulse power tool can be used to capture the angle characteristic while recording the passage of time. Preferably, the angle measurement device should not alter the mechanical properties of the impulse tool or the joint, particularly not the inertia characteristics of the impulse tool or the joint. A recommended method to accomplish this measurement is through the use of an identical socket for use on the power tool which has reflective markings each 90 degrees or through the use of a template for applying reflective markings to the production socket for reading the angular advance of the socket.

Figure 2:
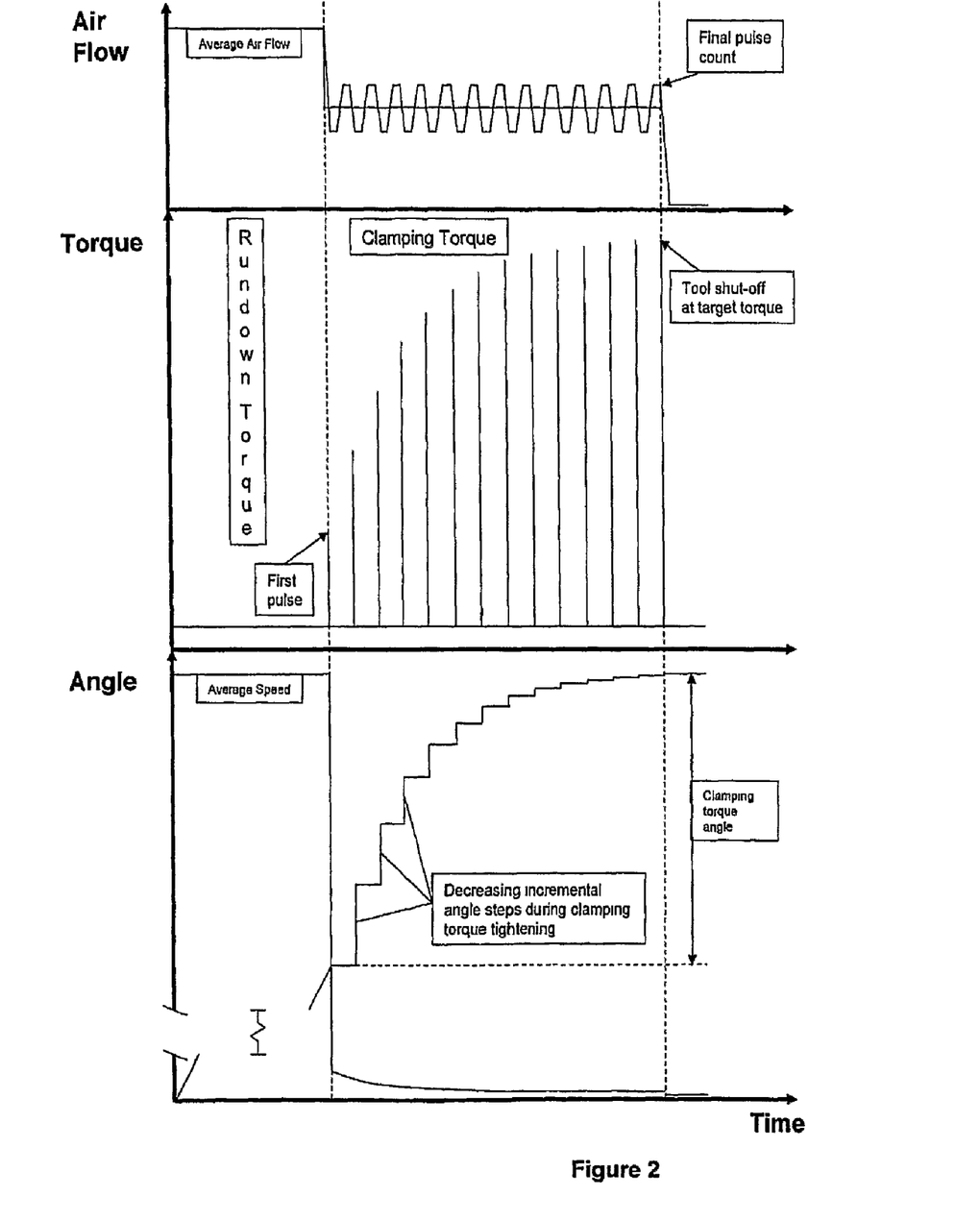
FIG. 2 is a composite graph of air flow, torque and angle versus time.

The second characteristic required for tool and joint compliance evaluation is to recognize when the assigned impulse tool is experiencing a pulse event during the tightening of the production joint. This is possible through the use of pulse counting during tightening. A characteristic of a pulse tool, when tightening a non-prevailing torque fastener (see FIG. 1) is that the first pulse happens at the end of the rundown of the fastener and the next pulse coincides with the first angle used to tighten the fastener. The angle recorded prior to this point was required to bring the joint to a snug condition. By counting the pulses and recording the time associated with the pulse events, we can determine how long it will take for the assigned impulse tool to tighten the specific production joint. In this example (a normal joint without prevailing torque), the first pulse signals the start of angle counting for clamping torque and the elapsed time until the last pulse (shut-off impulse tool) is the amount of time it should take to accomplish our clamping torque characteristic. The pulse information can be gathered in several ways. One method is through a properly matched flow meter used with the air supplied to the impulse power tool. This flow meter can be added inline with the tool for analysis or an integrated tool or tool control flow meter (provided by the tool manufacturer) can be used to collect this information. During the rundown, the air flow characteristic is high, then it drops to a lower average rate once the tool is tightening the joint with pulses and finally the flow rate drops to zero when the tool shuts off. The pulse count will be made using the initial high of the flow curve during clamping torque tightening until the last high flow spike or from when the average flow rate drops after the rundown tightening until the tool shuts off. This concept is illustrated in FIG. 2—Pulses, Angle and Time for a Normal Joint. As shown in the darker shaded air flow section of the chart, during clamping torque, the tool starts to pulse at the first drop in air pressure after the rundown of the fastener and is finished at the end of the last pulse. Alternatively, air pressure can be used to also evaluate the tightening activity of an air impulse tool. With air pressure, we see a low pressure condition during the rundown phase, followed by a higher average pressure during the pulse tightening phase and finally the highest pressure is recorded at the tool shut-off point. With pressure measurement, the low spikes during the pulse tightening phase coincide with each pulse delivered by the impulse tool. With the use of pressure, the pulsing time will be calculated at the start of the initial low to the last low spike or it can be determined with the increase in average air pressure until the high air pressure occurs with tool shut off.

The final method we can use to gather the pulse versus time information would be from the rotational motion sensor to determine when the pulsing starts and when the tightening and pulsing is completed. During rundown tightening with the angle method, a steady non-stepped application of angle is observed. This can be observed in FIG. 2, where the angle increases versus time in decreasing increments as can be seen in the clamping torque section of the angle portion of the chart. Once the tightening pulses start, the angle data increases in steps when compared to time. Therefore, when using the angle method for pulse evaluation, we get the best of both worlds, angle events with respect to time and when the pulses start and finish with respect to time. Alternatively, besides using the incremental angle evaluation, the average tool speed can also be used to determine the rundown torque event versus the clamping torque and tool shutoff event with respect to time.

By way of summary, the pre-simulation analysis provides the following information: specific production joint torque and angle analysis, including the corresponding torque value for the angle characteristic measured (this means one knows the angle of the starting snug torque, the progression of torque during angle tightening and the final target torque and angle);

the pulse-time signature analysis using flow rate or pressure, including the duration of the clamping torque pulsing event (this means one knows how quickly and with what frequency the pulse tool must operate with the joint simulator to simulate the tightening characteristic); and the angle-time signature analysis using a rotational motion sensor, including the duration of the clamping torque pulsing event (this means in addition to pulse-time, one knows another way to define how quickly and with what frequency the pulse tool must operate with the invention to simulate the tightening characteristic). When the torque and angle analysis is combined with the duration of time for pulsing on a normal joint, we know how to simulate the tightening characteristic to simulate the joint with the designated impulse power tool.

Additionally, the angle versus time analysis provides a method to simulate prevailing torque joints and yield characteristic joints. Prior to analysis of the impulse tool and the specific joint tightening, the torque and angle curve analysis can identify if a joint is exhibiting prevailing torque and/or yield tightening characteristics (see FIG. 3—Tightening Curve Prevailing Yield Joint). This torque and angle information in conjunction with the angle and time information (see FIG. 4—Pulses Torque Angle and Time Prevailing Yield Joint) from the rotational motion sensor will allow the prevailing and/or yield tightening simulation of the joint by the invented machine. The angle and time information from the rotary motion sensor will exhibit a consistent angle increment increase during the prevailing torque tightening which will allow the invention to know the start angle value for prevailing torque, the end angle value for prevailing torque and the time duration for the prevailing torque event during the tightening of the joint. The angle start of a prevailing torque event coincides with the first pulse of the impulse tool and the end of prevailing is when the angle increase increments decrease with the start of clamping load tightening. The angle increment characteristic can also be used to determine the timing and angle values for the yield tightening simulation during final torque. With a yield tightening, the yield event starts when the angle increment of clamp torque tightening stops decreasing and a consistent tightening angle is experienced. This consistent or even increasing (joint yielding) angle incremental value is maintained until the impulse tool shuts off. So, with this information, we know when the yield angle started, when the tool shut off angle was reached and the time duration of the yield tightening event. This angle, pulse and time information allows us to simulate the yield characteristic with the invented machine and the assigned impulse power tool.

For the evaluation of non-impulse power tools with the joint simulator, there must be an evaluation of the joint which is going to be simulated. Using currently available torque and angle analysis equipment, a torque and angle tightening curve analysis is performed for the specific joint which is to be reproduced. This torque and angle analysis provides a consistent joint rate which is expected for the specific product threaded joint. Since non-impulse power tools have a direct correlation between torque and angle for the tightening of a threaded joint, the hydraulic event timing for pressure and relief will be automatically adjusted, using the PC software algorithm developed for the invented machine, to achieve the desired torque and angle tightening curve simulation for certification and testing.

Figure 4:
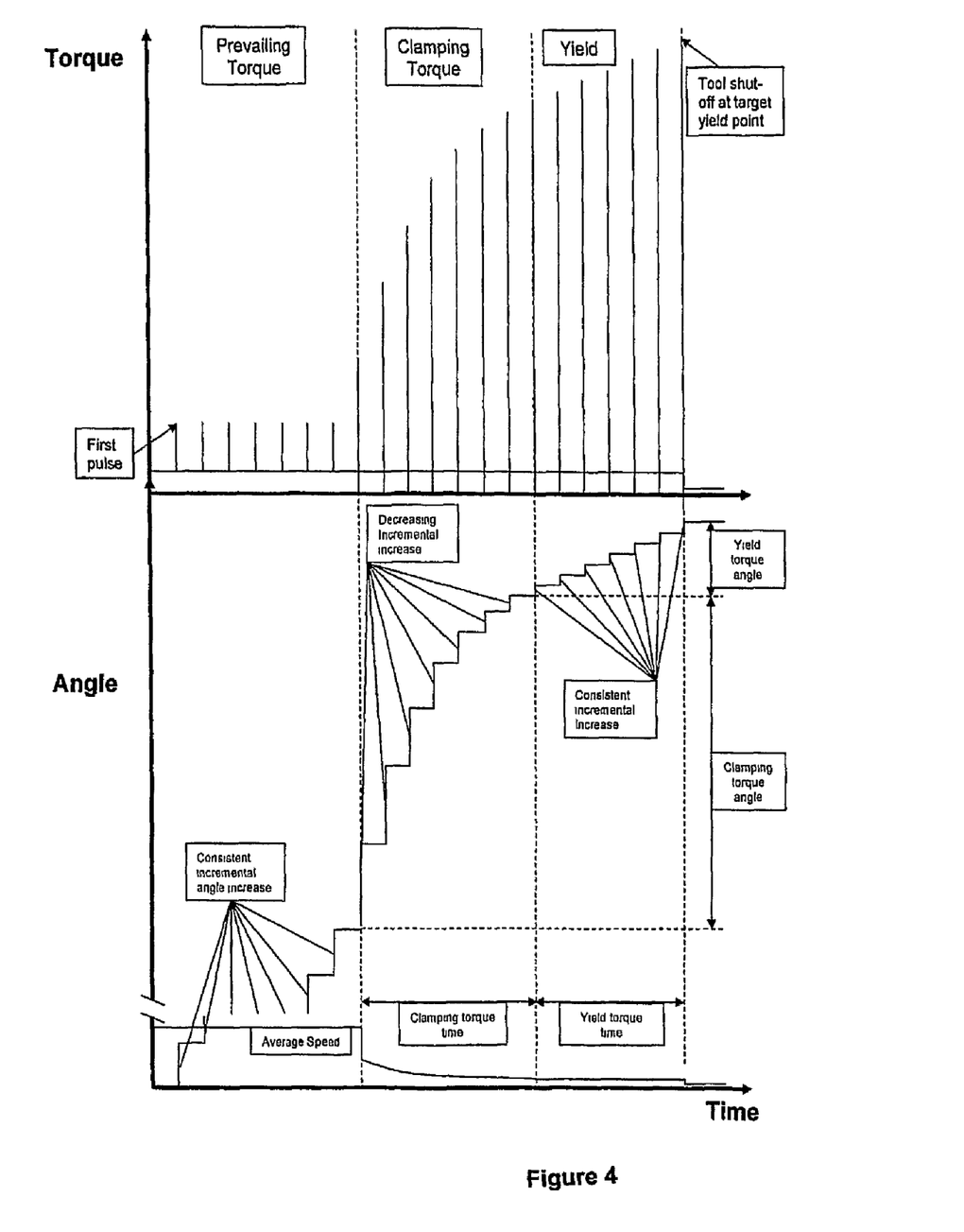
FIG. 4 is a composite graph of torque and angle versus time, for tightening a typical joint.
Figure 5:
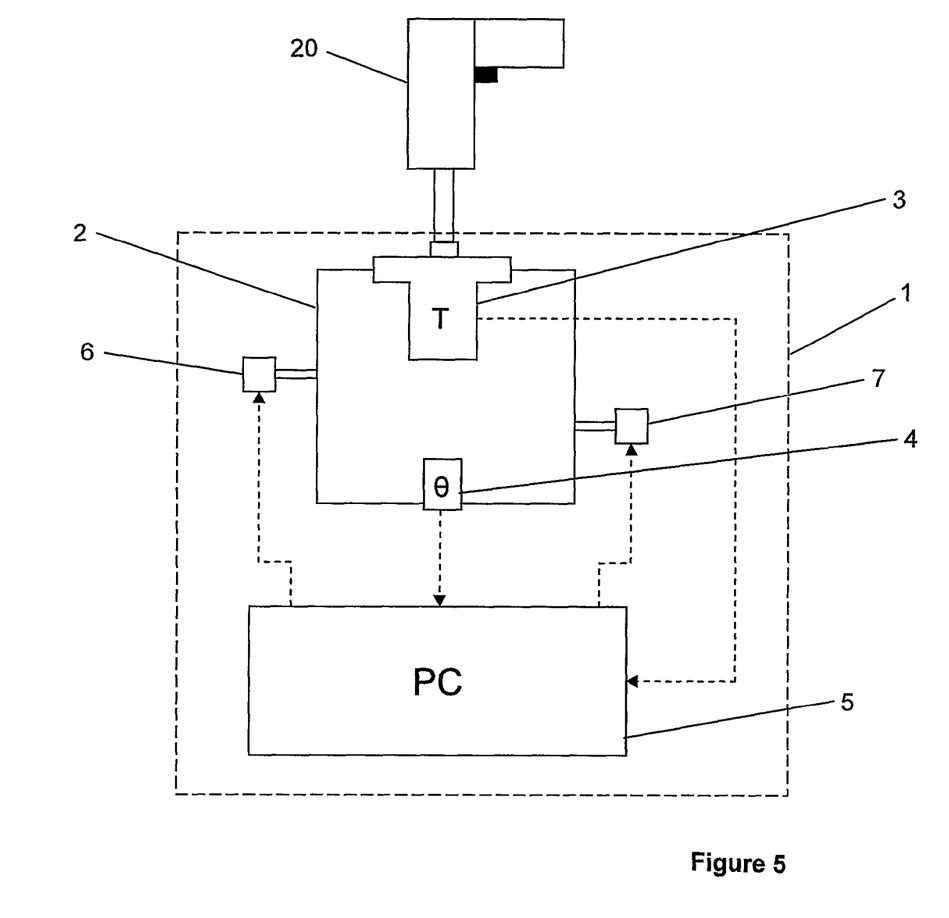
FIG. 5 is a representation of the joint simulator.

The invention for simulating joint characteristics in conjunction with a designated impulse or non-impulse power tool is as illustrated in FIG. 5. In FIG. 5, the extent of the joint simulator is noted by the dashed line box 1. The following is a description of the major components that comprise the invention. The housing 2 includes a specially designed static torque transducer 3 which provides feedback to the PC (personal computer) regarding the amount of torque being generated during the simulated tightening process. A non-contact linear encoder 4 is used in, conjunction with the PC to determine the angular increase resulting from the power tool tightening the simulated joint. PC 5 controls joint simulator 1 based on the values it receives from the torque transducer 3 and the linear encoder 4. This control is accomplished by PC 5 actuating the hydraulic pressure valve 6 and the hydraulic relief valve 7, to accomplish the measured production joint torque and angle characteristic illustrated in FIG. 1 or FIG. 3, in conjunction with the corresponding timing of events as detailed earlier in FIG. 2 or FIG. 4, for impulse power tools and simply the torque and angle characteristics illustrated in FIG. 1 or FIG. 3, for direct drive power tools. It may be understood that multiple pressure and relief valves may be provided, which can be operated by PC 5. The power tool being tested on the joint simulator is represented by the number 20.

Figure 6:
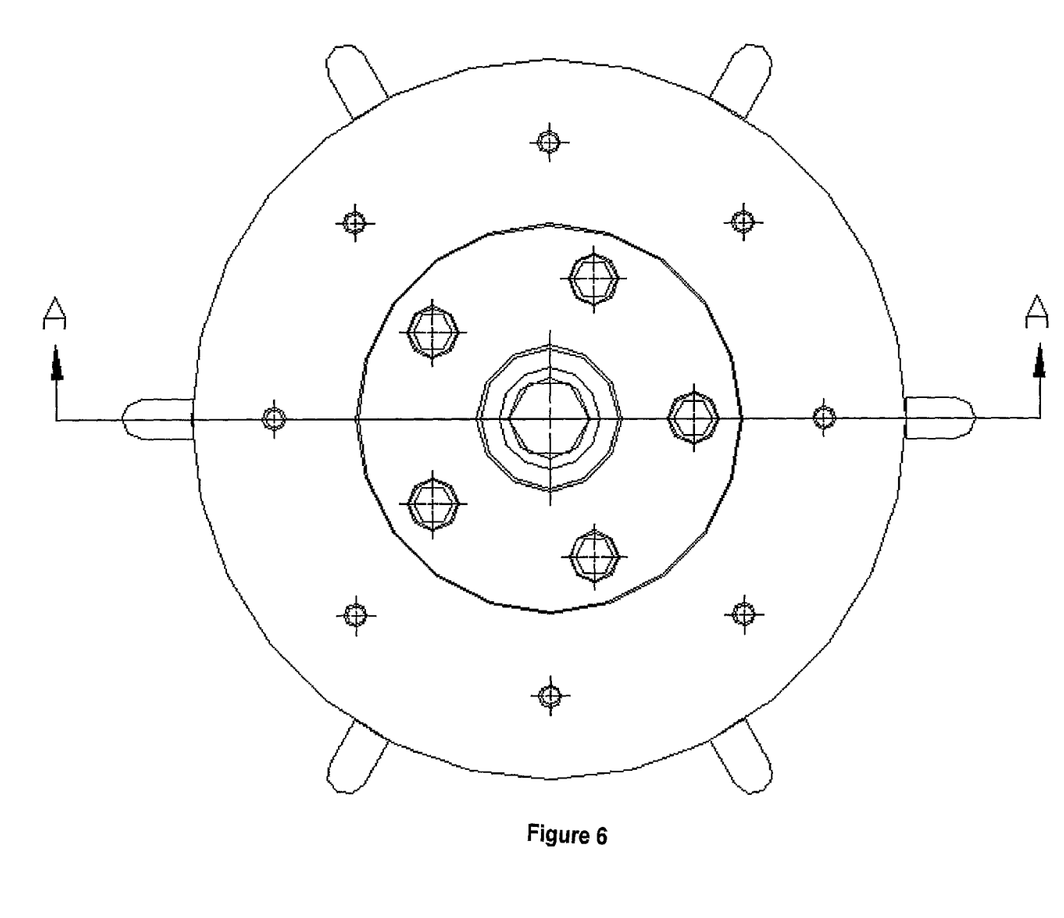
FIG. 6 is a top view of the joint simulator.
Figure 7:
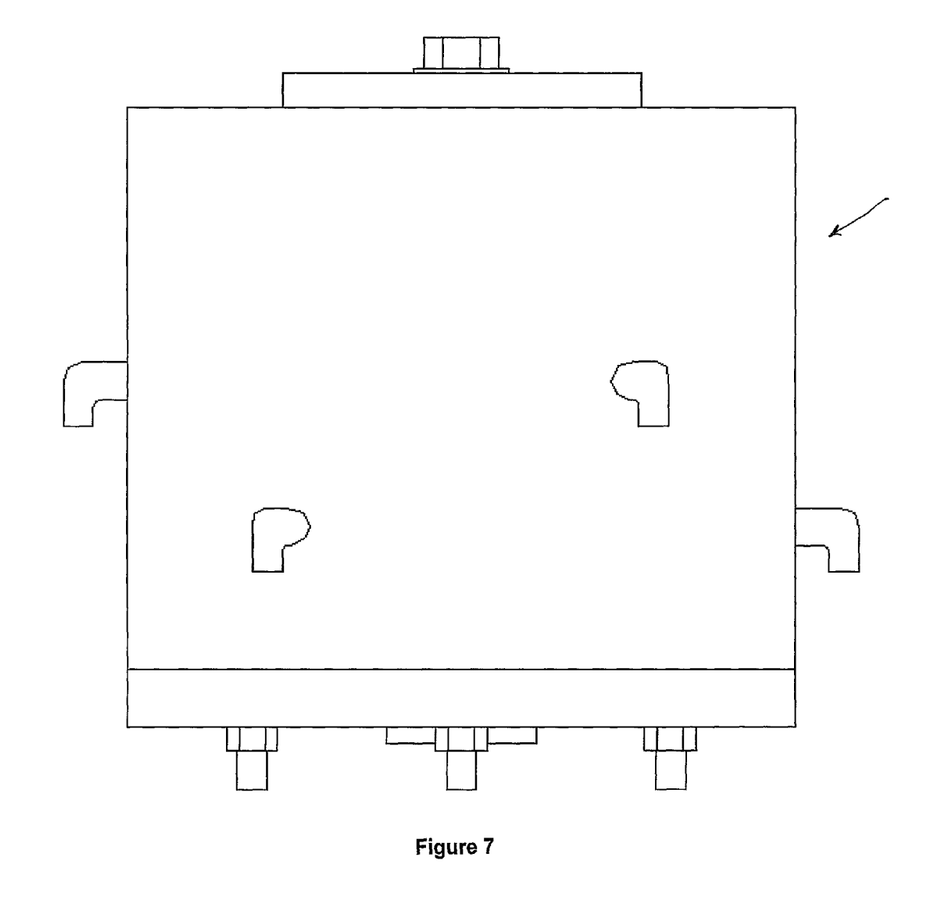
FIG. 7 is a side view of the joint simulator.
Figure 8:
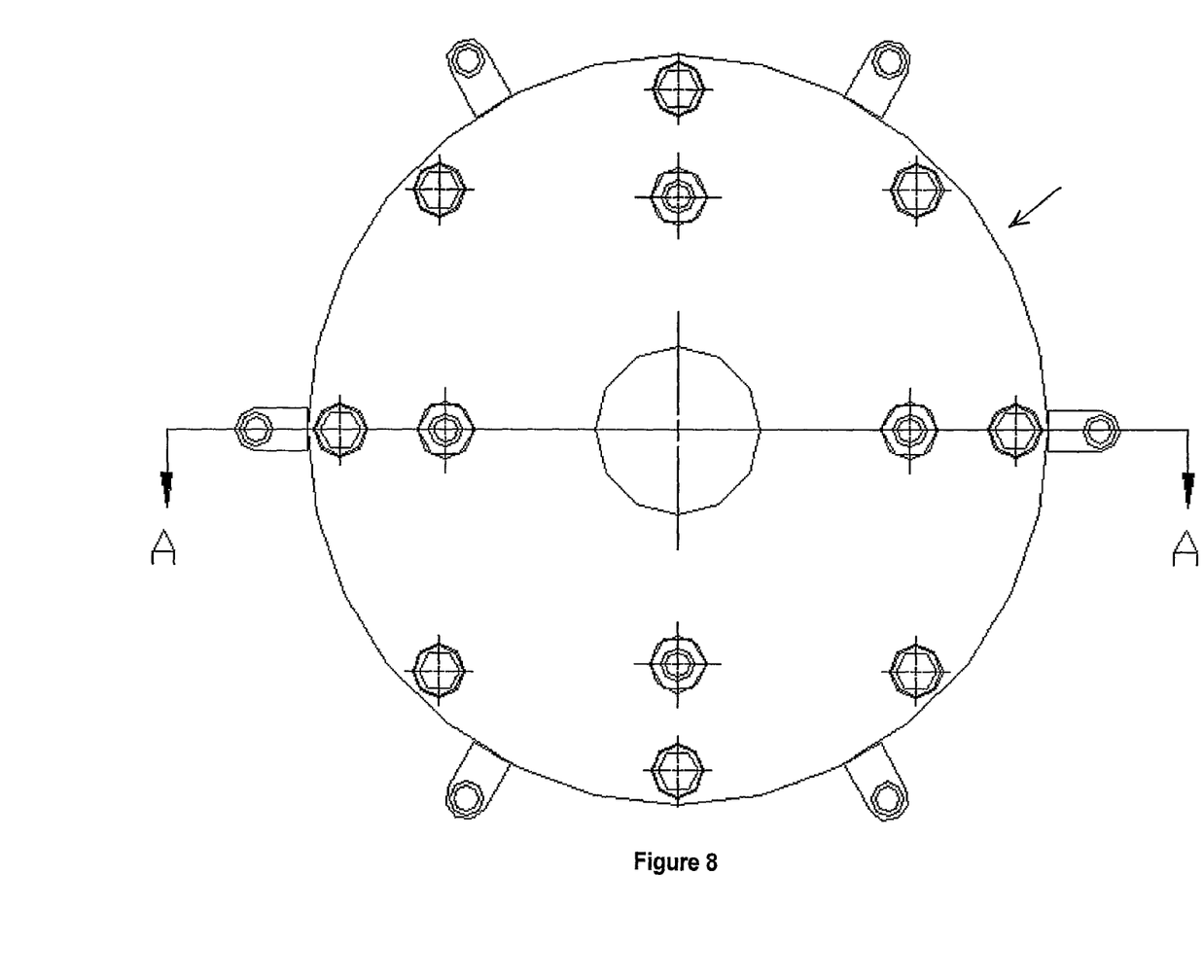
FIG. 8 is a bottom view of the joint simulator.
Figure 9:
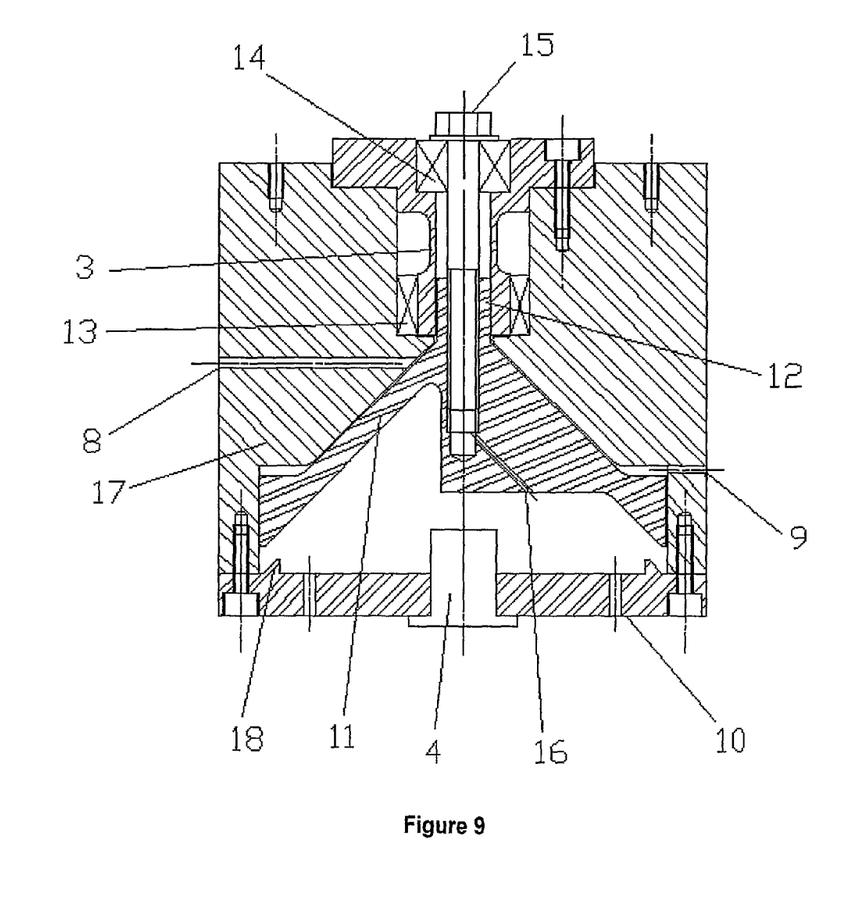
FIG. 9 is a cross-sectional view of the joint simulator taken along lines A-A of FIGS. 6 and 8.

The joint simulator is illustrated in FIG. 6—Top View, FIG. 7—Front View, FIG. 8—Bottom View and in FIG. 9—Section A-A View. Referring to FIG. 9, static torque transducer 3 provides torque information during the testing of a particular tool. This transducer design is recommended for achieving accurate results for the joint simulator, as the transducer provides realistic torque energy information, without influencing the results from the power tool being used with the joint simulator, i.e. it does not influence the compliance of the system as an inline rotary transducer would. The static torque transducer functions as a regular torque transducer in that as torque is increased, the transducer acts as a variable resistor allowing more voltage to pass through the transducer. The transducer output value is normally expressed in millivolts output per volt input. This mV/V value is sent to the PC which then converts it to a corresponding torque value.

Non-contacting linear encoder 4 precisely measures the distance from the encoder mounting position on the bottom of the joint rate simulator to the end of threaded piston 11. As the piston moves linearly, the distance value is communicated to the PC which then uses a formula to calculate the angular movement of the input shaft driven by the impulse or non-impulse tool. This formula is determined by the pitch of the thread used for input shaft 15, which drives piston 11. Linear encoder 4 is recommended for the measurement of the angle characteristic, as its accuracy is not influenced by the impulses from an impulse power tool and the linear encoder does not influence the results from the power tool being used with the joint simulator, i.e. compliance of the system is not affected as would be the case with an inline rotary angle encoder, which may alter the inertia of the system. The home or zero angle position of piston 11 is at a predetermined position where the hydraulic pressure stops the travel of piston 11 prior to the piston touching the upper end 17 of the housing. Preferably, PC 5 should stop piston 11 during a joint rate simulation prior to touching the top of the cylinder 17 or the torque transducer measured value may be incorrect. This stopping point is dependent on the duration of the angle events measured on the production joint with the designated power tool.

Hydraulic pressure valve 6 and relief valve 7, shown in FIG. 5, are electrically controlled via the PC 5 and can be several valves used in parallel for pressure and relief. The pressure and relief valves can be isolated and opened using fast acting valves in series with the variable valves or by using the variable valves from completely open to fully closed positions. Referring to FIG. 9, inlet port 8 provides hydraulic fluid, under pressure, to the chamber positioned above the piston 11. The hydraulic fluid supplied to inlet port 8 is regulated from a hydraulic pump system and controlled via the hydraulic pressure valve 6. Hydraulic fluid is released from the chamber above piston 11 through outlet port 9. The hydraulic fluid relief from outlet port 9 is controlled by relief valve 7.

The joint simulator is provided with a hydraulic return port 10, to return hydraulic fluid from the bottom of the joint simulator to the fluid reservoir of hydraulic pump system. There is a certain amount of leakage of hydraulic fluid, which may be expected from around piston 11, splines 12, and from the threaded input shaft weep hole 16, during normal system operation. Piston 11 is designed so that splines 12 on the transducer end of the piston move freely up and down with the piston, while providing torque transmission from the threaded input shaft 15 to the torque transducer 3. Hydraulic pressure, developed between piston 11 and the upper end 17 of the housing, stops the further tightening of the threaded input shaft 15 during a joint simulation, and the resultant torque during the process is transferred through splines 12 to the transducer 3. To reduce inertia in the design of the system, piston 11 may be hollow, with a reinforced cone shape to maximize the pressure influence and to minimize the mass. Additionally, piston 11 has hydraulic pressure sealing of a low friction design to prevent sealing influences from creating inertia in the system. To improve the simulation of low rundown torque applications, the piston may be provided with a two piece design (not shown), such that when the piston is at the bottom of the chamber or cylinder, a sliding core move towards the linear encoder with continued threaded input shaft 15 loosening action, and is arrested above the linear encoder using a raised flange stop. When low rundown torque joint simulation is required, the sliding cone marries with the simulation piston at the moment when snug torque should be experienced during simulation. For prevailing torque simulations, the free rundown of the core will not influence test results.

Splines, are preferably machined to provide an exact smooth sliding fit between piston 11 and transducer 3, without excessive play. The hydraulic pressure used to stop piston 11 provides lubrication for splines 12, thereby minimizing wear. In addition, splines 12 are designed for torque transfer, to prevent compression or tension from being introduced to the torque transducer during the operation of the joint rate simulator.

A static transducer free end bearing 13 allows transducer 3 to absorb the torque transmitted from splines 12. The free rotational movement of bearing 13 contributes to the linearity and accuracy of the static transducer 3. Bearing 13 minimizes the transfer of bending moments to the transducer, such as compression and tension.

Input shaft bearing 14 provides multiple functions, i.e. it allows torque from the power tool to be transmitted to the simulation piston 11, it maintains input shaft 15 in the correct position as the shaft experiences tension force during simulation, and it seals the hydraulic pressure within the joint simulator.

Free end bearing 13 and input shaft bearing 14 are supported in the upper end 17 of housing 2.

Threaded input shaft 15 is connected to the output of a tool which needs to be tested. Input shaft 15 should be highly resistant to torsional stress, as angular losses during the input of torque will affect the angular results measured by the joint simulator. Input shaft 15 receives lubrication from the pressurized hydraulic fluid, to minimize wear of the threads. The hydraulic fluid which lubricates input shaft 15 is returned to the hydraulic system via weep hole 16 and is then returned to the pump via oil return holes 10.

Hydraulic cushion 18 is provided to stop the downward travel of piston 11, when input shaft 15 is being loosened after a joint simulation. In particular, hydraulic cushion 18 prevents piston 11 from slamming into the base of housing 2 and potentially locking the device.

Each joint rate simulator has a range of torques for which it is applicable and for which it can faithfully reproduce the inertia of the production joint being simulated. Because of this, it is proposed to provide several different cells, designed to cover the torque range used at an assembly plant. For example, a set of four joint simulators would be provided to cover torques from 1 Nm to 450 Nm and the capacity of these cells would be 10 Nm, 50 Nm, 250 Nm and 500 Nm.

Use of Joint, Angle and Time Analysis Data for Power Tool Evaluations

The specific product joint analysis data, when used in conjunction with the joint rate simulator, including the PC, simulates the use of the power tool to be tested on a specific joint. The output shaft of the tool is connected to the input for the joint simulator (FIGS. 5 and 9). The PC software controls hydraulic pressure and relief valves to add and remove pressure from the invented machine in the simulation of the specific characteristics of the joint and power tool being evaluated. The sensing components of the joint simulator continuously provide torque (torque transducer) and angle information (linear encoder information converted into angle displacement) to the PC software, during the tightening of the simulated joint. The PC controls the pressure and relief of the hydraulic fluid, to reproduce the correct timing and duration for each angle event. The angle events are associated with fastener rundown, prevailing torque (if present), clamping torque and yield torque (if present). This closed loop torque and angle feedback system allows the PC software to recognize the real time performance of the joint simulator and adjust the various angle event hydraulic pressure/relief parameters to provide an optimized simulation of the specific product joint, for the impulse power tool being evaluated. These optimized angle, torque and time parameters used for the specific tightening events will consistently reproduce a joint for testing the impulse power tool, irrespective of product availability in the production line. This means that impulse tools can be tested for machine capability, certification, durability and repeatability, without having to use production parts.

For non-impulse power tools the data which is used by the joint simulator PC software is the specific joint torque and angle analysis data. Based on the various angle characteristics of the specific product joint, timing characteristics for each angle event are software pre-chosen and then the simulation is performed using the assigned non-impulse power tool. Based on the closed loop feedback of torque and angle from the invented machine, the PC software algorithm modifies the parameters to obtain the optimal simulation of the specific joint for the tool being tested. These optimized angle, torque and time parameters used for the specific tightening events will consistently reproduce a joint for testing the non-impulse power tool irrespective of product availability in the production line. This means that non-impulse tools can be tested for machine capability, certification, durability and repeatability without having to use production parts.

Hand Torque Wrench Evaluations

In addition to power tools used for threaded fastenings, hand held torque wrenches can be calibrated and tested on the joint simulator. Using a torque wrench with a specific fixed parameter set in the PC software and applying the fastening torque with the torque wrench to the invented machine, the joint simulator will provide to the PC software an independent master torque value to compare to the expected torque wrench performance. This test of a torque wrench is accomplished through the PC control of the pressure and relief valves in such a way that the simulation piston is prevented from advancing when clockwise torque is applied by the torque wrench to the input shaft. The torque is then read through the use of the static transducer and compared to the expected results on the PC.

Example of Joint Simulation for an Impulse Power Tool

Figure 3:
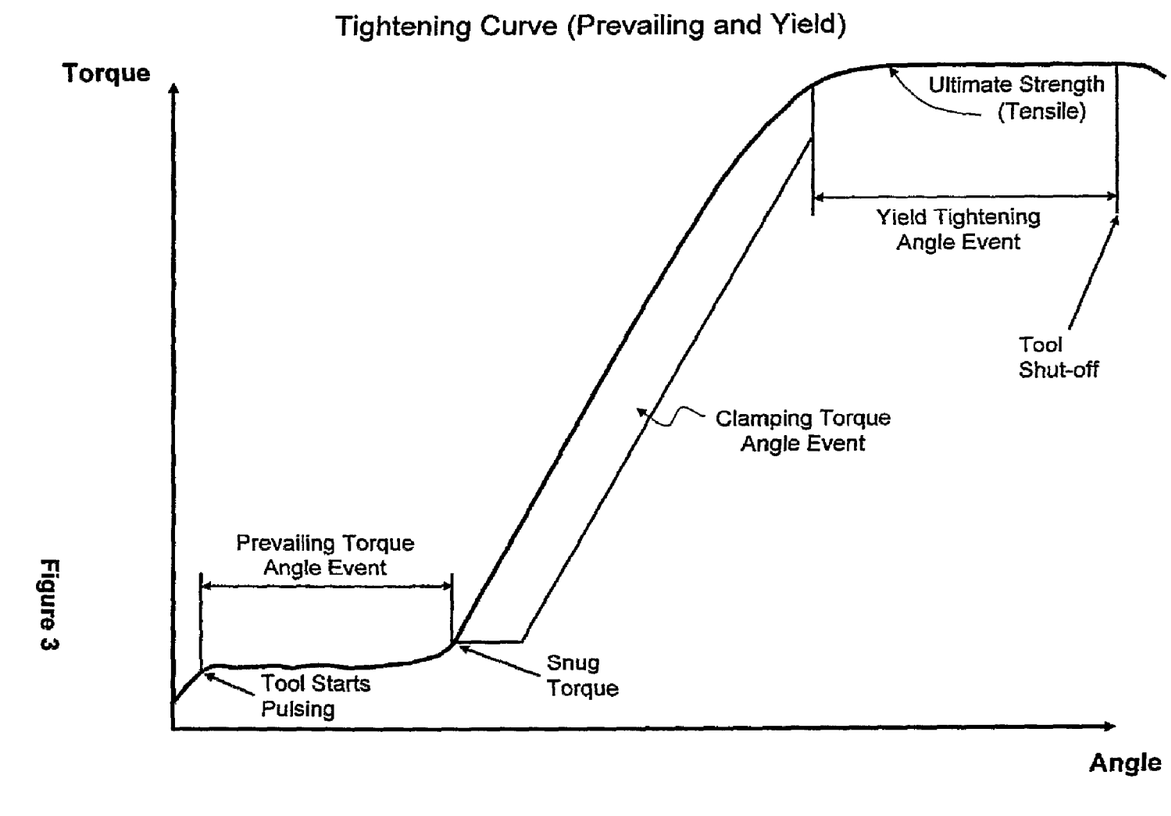
FIG. 3 is a graph of torque versus angle, identifying prevailing and yield events.

Phase 1—the production joint is sampled with torque and angle analysis which results in a consistent torque and angle graph as illustrated in FIG. 3—Tightening Curve Prevailing Yield Joint.

Phase 2—the impulse power tool uses angle measurement during rundown and tightening to confirm that yield control tightening has been achieved. A series of residual torque analyses of the impulse tool confirm that the impulse tool is consistently tightening to the target torque plateau.

Phase 3—the tool is used to tighten the joint with the reflective index marked production socket as used in normal production except for the reflective markings. The rotational measurement sensor is used to measure the prevailing torque rundown, linear clamping torque tightening and finally the yield tightening to final tool shut-off. Angle, pulse and timed event information is collected by the multi-channel data collection/analysis device connected to the rotational measurement sensor. These analyses are performed for several production joint tightenings and it is confirmed that the results are consistent with the curves generated as illustrated in FIG. 4—Pulse Torque Angle and Time Prevailing Yield Joint. Alternatively, the pulse tool's integrated angle measurement device can be used to measure the angle, pulse and timing information as well.

Phase 4—the joint torque and angle analysis data is entered into the PC software for the joint and impulse power tool being evaluated, in addition to the angle, pulse and event timing data collected using the rotational measurement sensor and the data collector.

Figure 10:
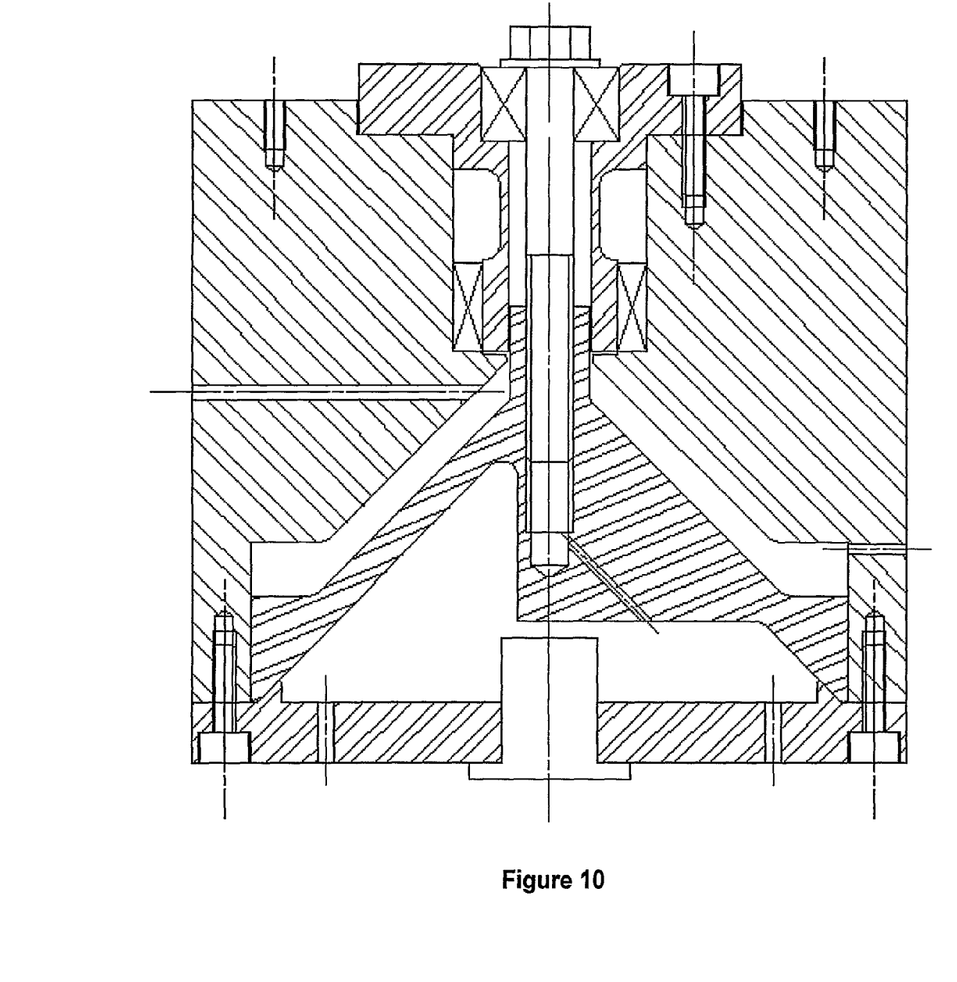
FIG. 10 is a cross-sectional view of the joint simulator representing a prevailing torque position.
Figure 11:
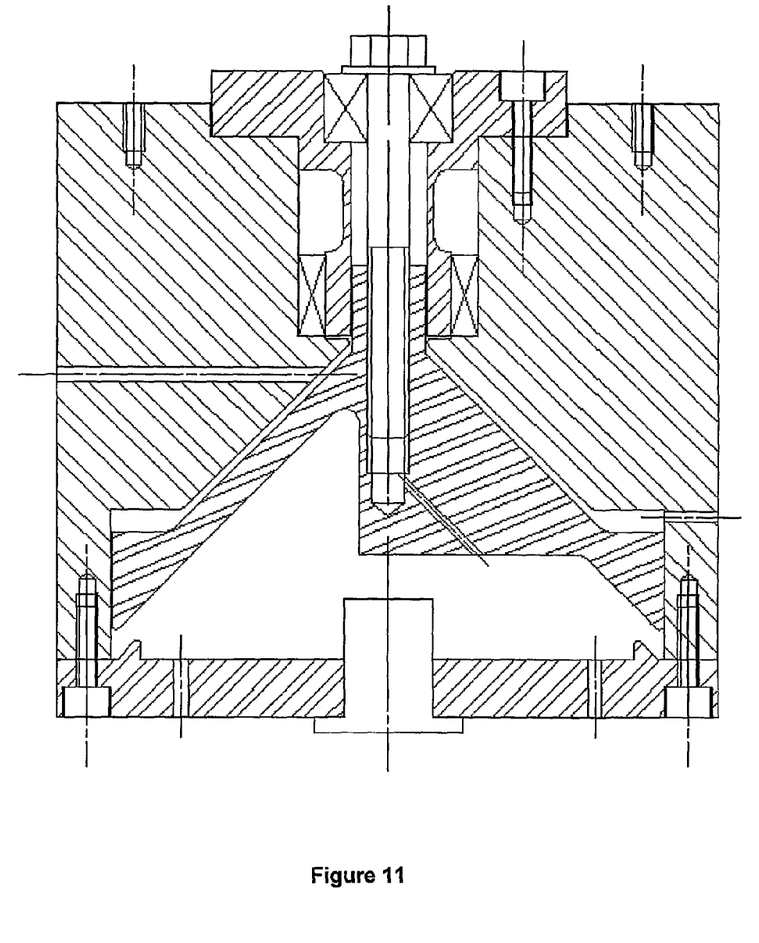
FIG. 11 is a cross-sectional view of the joint simulator representing a clamping torque position.
Figure 12:
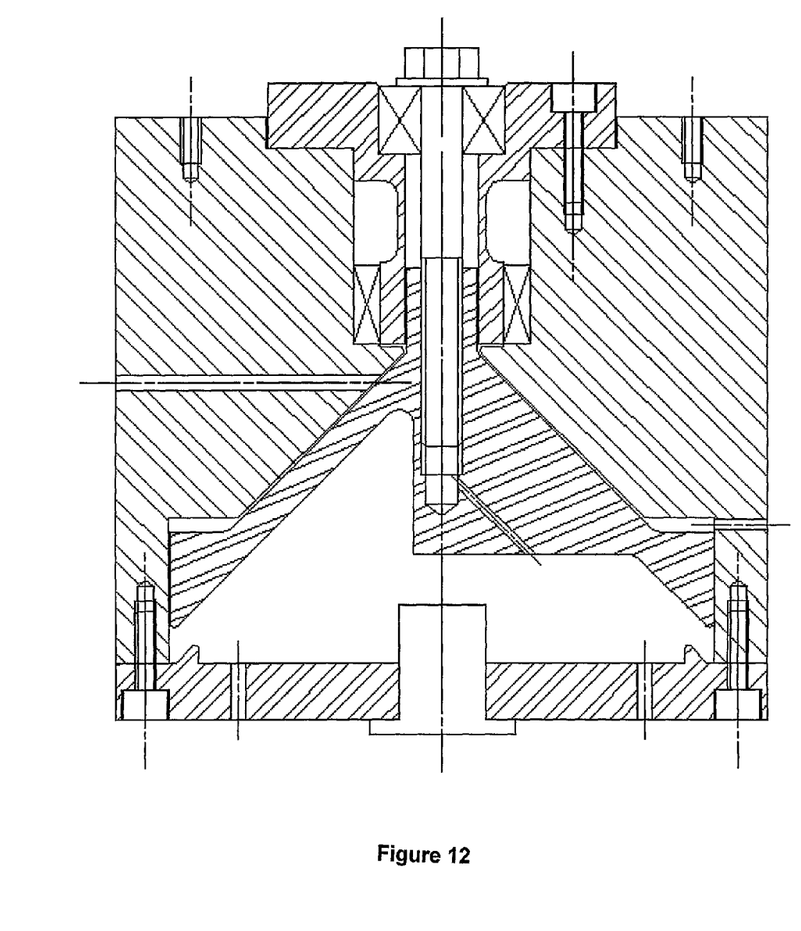
FIG. 12 is a cross-sectional view of the joint simulator representing an end of cycle torque position.

Phase 5—the measured production tool is tested on the appropriate invented joint simulator with PC control. The joint is initially simulated using approximate pressure curves for each of the tightening segments (prevailing, clamping and yield) based on the analysis information entered into the software program. The invented joint simulation device illustrated in FIG. 5 runs a series of joint simulations to determine the best simulation for the impulse power tool, to create a feedback curve which looks very similar to the FIG. 4 torque and angle curve measured on the production joint when it was tightened by the impulse tool. The starting position of the joint simulator for prevailing torque tightening simulation is as illustrated in FIG. 10—Joint Simulator Prevailing. After the torque angle and time criteria are performed for prevailing tightening, the position of the invented joint simulator is as indicated in FIG. 11—Joint Simulator Clamping Torque. After the clamping torque tightening, the torque, angle and time requirements are performed for the yield tightening activity until the invented joint simulator is in the stopped position as shown in FIG. 12—Joint Simulator at End of Cycle. The results for the impulse tool tested on the optimized simulated joint provide measured torque with angle data in conjunction with timing information showing that the tool is performing consistently and that the tool meets the manufacturing plant's machine capability requirements. The tool is then allowed to be placed into production use on the specified production joint. If the tool had failed to perform consistently, the tool would not be allowed to be used in production.

Phase 6—the tool is periodically evaluated using the joint simulator to ensure that the tool still meets the plant's machine capability requirements. If post assembly analysis shows that the tool may not be performing correctly, the joint simulator is used to evaluate if the tool is the real cause of the problem (could be caused by parts or process issues). After the tool is repaired or serviced, it is tested on the joint simulator to make sure that it was repaired properly and that is still performs consistently on the joint simulator.

What I claim is:

1. A joint simulator comprising:
   (a) a housing having a chamber;
   (b) a piston, slidable within the chamber of the housing;
   (c) a shaft rotatable within the housing, having (i) an end configured to engage a power tool to be tested, and (ii) a threaded end engaged with the piston, whereby rotating the shaft causes the piston to slide within the chamber;
   (d) hydraulic fluid filling a section of the chamber formed by a side of the piston and the housing;
   (e) a pressure valve for regulating a flow of hydraulic fluid into the section of the chamber;
   (f) a relief valve for regulating the flow of hydraulic fluid out of the section of the chamber;
   (g) computer software programmed to actuate the pressure and relief valve to simulate a joint characteristics of a specific joint to be simulated; and
   (h) a means to measure an angular displacement of the shaft.

2. The joint simulator of claim 1, further comprising a transducer to measure a torque applied to the shaft.

3. The joint simulator of claim 1, wherein the means to measure the angular displacement of the shaft comprises a linear distance encoder capable of measuring a travel of the piston.

4. The joint simulator of claim 1, wherein the computer software is programmed based on measurements of angular displacement, pulse events and time acquired from tightening the specific joint to be simulated with a power tool.

5. The joint simulator of claim 4, wherein the computer software is programmed to simulate tightening with an impulse power tool.

6. The joint simulator of claim 1, wherein an increase in the hydraulic pressure in the section of the chamber causes an increase in the torque required to rotate the shaft.

7. The joint simulator of claim 1, wherein rotating the shaft draws the piston toward the end of the shaft configured to engage a power tool.

8. The joint simulator of claim 1, further comprising a static torque transducer.

9. A method of testing a performance of a power tool using a simulated joint, comprising the steps of:
   (a) measuring a change in angle versus time during the performance of the power tool, while a fastener of a specific joint to be simulated is being tightened, to create joint analysis data;
   (b) providing a joint simulator device comprising a housing having a chamber; a piston, slidable within the chamber; a shaft rotatable within the housing, having (i) an end configured to engage a power tool to be tested, and (ii) a threaded end engaged with the piston, whereby rotating the shaft causes the piston to slide within the chamber;

hydraulic fluid filling a section of the chamber formed by a side of the piston and the housing; a pressure valve for regulating a flow of hydraulic fluid into the section of the chamber; a relief valve for regulating the flow of hydraulic fluid out of the section of the chamber; computer software programmable to actuate the pressure and relief valve; and means to measure an angular displacement of and torque applied to the shaft;

(c) enter the joint analysis data into a software program to simulate a characteristics of the specific joint to be simulated;

(d) engaging the power tool to be tested with the end of the shaft and operating the power tool, thereby generating angular displacement, torque and time data;

(e) comparing the data generated by testing the power tool with the joint analysis data created by measurement of the specific joint to be tested to determine whether the tested power tool is in compliance.

10. The method of claim 9, wherein the power tool to be tested is an impulse power tool, and the joint analysis data obtained during the performance of a power tool, while the fastener of the specific joint to be simulated is being tightened, includes pulse event versus time measurements.

11. The method of claim 10, wherein the hydraulic pressure in the section of the chamber is increased as a function of time during testing of the power tool.

12. The method of claim 10, wherein the torque required to rotate the shaft increases as a function of angular displacement.

13. The method of claim 12, wherein the hydraulic pressure in the section of the chamber is regulated based on feedback obtained from measurement of the angular displacement of the shaft obtained during testing the impulse power tool.

14. The method of claim 10, wherein an increase in the hydraulic pressure in the section of the chamber causes an increase in the torque required to rotate the shaft.

15. The method of claim 10, wherein rotating the shaft draws the piston toward the end of the shaft configured to engage a power tool.

16. The method of claim 9, wherein the angle versus time joint analysis data for the specific joint to be simulated is obtained without changing the inertia characteristics of the power tool or the specific joint to be simulated.

17. The method of claim 16, wherein the angle versus time joint analysis data is obtained from an external rotational motion sensor or a rotational motion sensor that is integrated in the power tool.

18. The method of claim 9, wherein the means to measure the angular displacement of the shaft comprises a linear distance encoder capable of measuring a travel of the piston.

19. The method of claim 9, wherein the means to measure the torque is a static torque transducer.

20. The method of claim 19, wherein the piston further comprises a spline for maintaining alignment of the piston relative to the housing.

* * * * *